(12) United States Patent
Bhadriraju et al.

(10) Patent No.: US 7,409,047 B1
(45) Date of Patent: Aug. 5, 2008

(54) PERSONALIZED TELEPHONE DIRECTORY AND CALLING SYSTEM

(75) Inventors: Vijay Kumar Bhadriraju, Durham, NC (US); Donnie Allen Smith, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/036,258

(22) Filed: Feb. 24, 2008

(51) Int. Cl.
*H04M 1/64* (2006.01)

(52) U.S. Cl. .............................. 379/88.03; 379/201.02; 379/207.01

(58) Field of Classification Search .............. 379/88.03, 379/88.01, 201.01, 201.02, 207.01
See application file for complete search history.

(56) References Cited

U.S. PATENT DOCUMENTS

| | | | |
|---|---|---|---|
| 6,229,880 B1 * | 5/2001 | Reformato et al. ....... | 379/88.01 |
| 6,829,337 B2 | 12/2004 | Misumi | |
| 6,961,409 B2 | 11/2005 | Kato | |
| 6,963,633 B1 * | 11/2005 | Diede et al. .............. | 379/88.03 |
| 7,228,277 B2 | 6/2007 | Nagashima | |
| 2004/0018856 A1 | 1/2004 | Park et al. | |
| 2004/0171372 A1 | 9/2004 | Tokudome | |
| 2006/0105790 A1 | 5/2006 | Jin et al. | |

* cited by examiner

*Primary Examiner*—Olisa Anwah
(74) *Attorney, Agent, or Firm*—Max Value IP, LLC

(57) ABSTRACT

An embodiment of this invention provides a secure, integrated and hierarchical database to store phone numbers of services, along with personal protected information required by the service. This hierarchical data is stored for an individual or a group of individuals and will be made available when they place a call to one of the service phone numbers stored in the application. One of the solutions described in this disclosure allows a user to register frequently-used phone numbers, and any personal data required by the associated services, on a web site under a password protected account associated with the user. The user(s) can access this information by dialing a phone number. This way, the enrolled users can place a call to any registered phone number by first calling a predetermined number and then navigating to the desired number.

1 Claim, 3 Drawing Sheets

PERSONALIZED TELEPHONE DIRECTORY AND CALLING SYSTEM

BACKGROUND OF THE INVENTION

Toll free phone numbers, such as ones starting with 1-800, 1-877, 1-866, etc., are used by everyone to get help or resolve issues with various services. These services include, but are not limited to, personal insurance, credit cards, utilities, customer services, shopping, voice-enabled services, etc. Most services provide a unique toll-free number that can be used to get help for that service. Consumers struggle to keep track of these numbers and are constantly searching for them on the Internet, on consumer service cards (insurance, credit cards, back cards, etc.), or by calling directory assistance. Using a manual or electronic directory of toll free numbers involves looking up the number and placing the call manually, through a wired or wireless phone. Prior art, such as techniques for Personalized Telephone Directory and Calling Service (PTDS), provides voice-enabled dialing, as a convenience, but this requires storing all the toll free numbers on a phone set. Voice-enabled dialing has an additional drawback in that the voice recognition often fails to detect speech patterns correctly, forcing the user to additional steps to place a call.

A proper technique is needed to consolidate all the phone numbers used by an individual. The solution should also be able to store any private or confidential information, such as insurance policy numbers, credit card numbers, utility bills account numbers, etc., required by the service to complete a transaction when the call is placed. The solution should automatically place the call for the user using the stored phone numbers. The user should be able to use his/her personal information stored along with the phone number when the call is placed between the user and the service. The solution is not limited to toll free numbers and includes local numbers, long distance numbers, and international phone numbers.

SUMMARY OF THE INVENTION

An embodiment of this invention provides a secure, integrated and hierarchical database to store toll free, long distance, local, and international phone numbers for any service that can be obtained through a phone call along with personal protected information required by the service. This hierarchical data is stored for an individual or a group of individuals and will be made available to the individuals, when they place a call to one of the numbers stored in the application. One of the solutions described in this disclosure allows a user to register frequently-used phone numbers and any personal data required by the associated services on a web site under an account associated with the user. Access to this information is password protected and is available to the user by dialing a single toll free, long distance or local number. Enrolled users can place a call to any registered phone number by calling a single number and navigating to the desired number using the application's voice response unit interactive interface.

DETAILED DESCRIPTION OF THE PREFERRED EMBODIMENTS

One embodiment can be implemented as a software telecom application that is hosted by a phone company (e.g. AT&T@, Sprint®, Verizon®, etc). The phone company deploys this application and provides it as a service. Any individual or a group of individuals (e.g. a family) can sign up for this service.

In one embodiment, when the user calls the phone company to sign up for this service, the user is given a unique password. This password is required when the user calls in to use this service. The application includes a directory component accessible via the Internet. The directory application allows users to enter frequently called toll free, long distance and local phone numbers associated with services (e.g. insurance service—auto, health, home) or contacts (e.g. family, friends). The user can also enter personal data that may be required by the service associated with a number entered in the directory. Users can modify their directory entries at any time by accessing the directory application via the Internet.

One embodiment of a telecom application provides a secure, integrated and hierarchical database to store toll free, long distance, local and international phone numbers for any service that can be obtained through a phone call (e.g. insurance companies, credit card companies, utility companies, company customer services, etc.) along with personal protected information (e.g. social security numbers, credit card numbers, insurance policy numbers, account numbers, date of births, etc.) required by a service. This hierarchical data is stored for an individual or a group of individuals (e.g. for a family) and will be available to the individual, when the individual places a call to one of the numbers stored in the application. Prior art requires that a user register each phone number in a manual or electronic phone book, which can be used to look up and place a service call. One of the solutions described in this disclosure allows a user to register frequently-used phone numbers and any personal data required by the associated services on a web site under an account associated with the user. Access to this information is password protected and is available to the user by dialing a single toll free, long distance or local number. Enrolled users can place a call to any registered phone number by first calling a predetermined number and then navigating to the desired registered number using the application's voice response unit interactive interface. As in FIG. 3 and discussed later, personal information registered by the user (e.g. 305) for a particular service (107) can be sent (307) to the service (or customer representative) using the application's voice response unit interactive interface.

Figure 2:
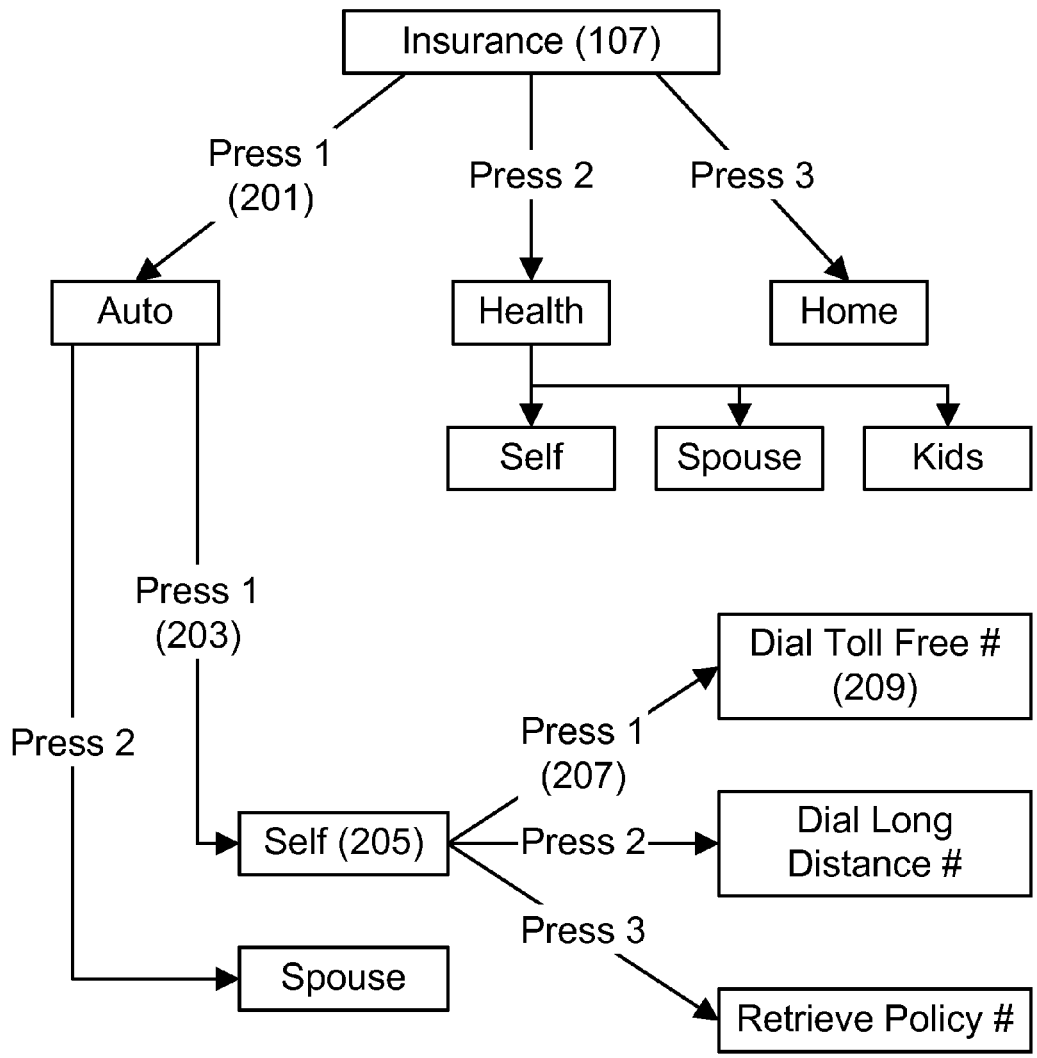
FIG. 2 is the continuation of the previous figure demonstrating the process if the requested service is Insurance.

In one embodiment, the user dials a toll free, long distance or local number to access the telecom application. The application prompts the user to enter its password. The password authorizes the user to use the telecom application (101). If password is incorrect the user is asked to re-authenticate or exit the system. After a user is authorized, he/she enters his/her personalized telephone directory (103) created using the directory application. The application provides voice prompts in the hierarchy (105, 201, 203 and 207) for the user to access a specific category or group (205), for which the user has registered phone numbers. After selecting a category (205) as shown in FIG. 2, a user is prompted to select a specific number to call (209). The application then places and hosts a third party call (301) on behalf of the user. In one embodiment, the third party call connects the user, the insurance company, and the PTDS in the form of a 3-way call.

Figure 3:
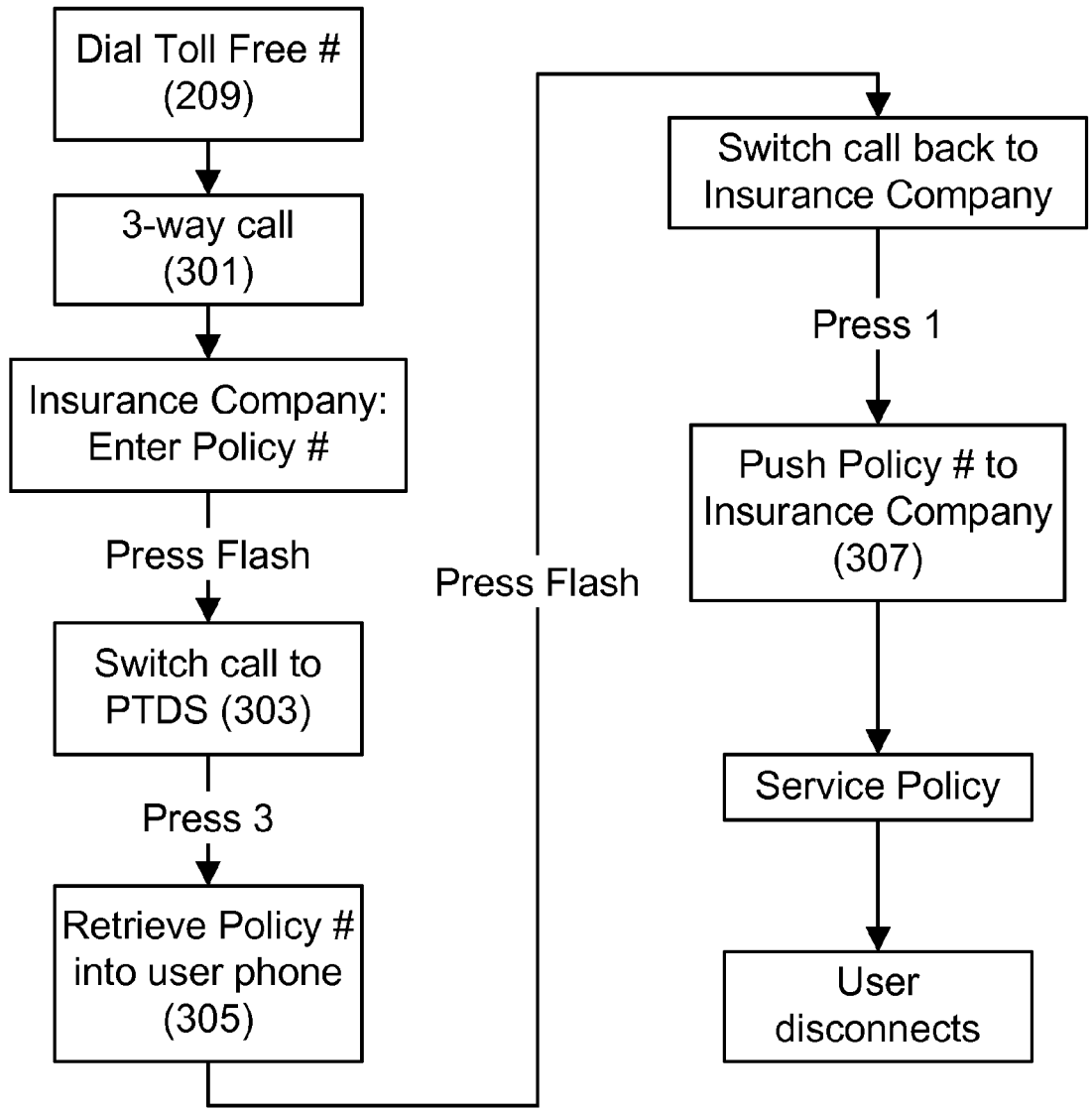
FIG. 3 is the continuation of the previous figure demonstrating the process after the toll free number of the requested service (Auto) in the subcategory is dialed.

As in the embodiment illustrated in FIG. 3, if the call is placed to a service (e.g. insurance, etc.) which requires the user to provide some type of personal information (pin number, account number, etc.), the user has the option of providing that information from his/her personal directory by entering a configurable key combination (303) that will place the requested information in his/her personal directory (305) where he/she can select and send (307) to the called party.

In this example, after the user completes a call, the user has the option of either ending the call or selecting another number in the current category or by navigating to the home directory to select another category to place a call from that category. This way the user can place multiple calls just by authenticating once into the telecom application.

Figure 1:
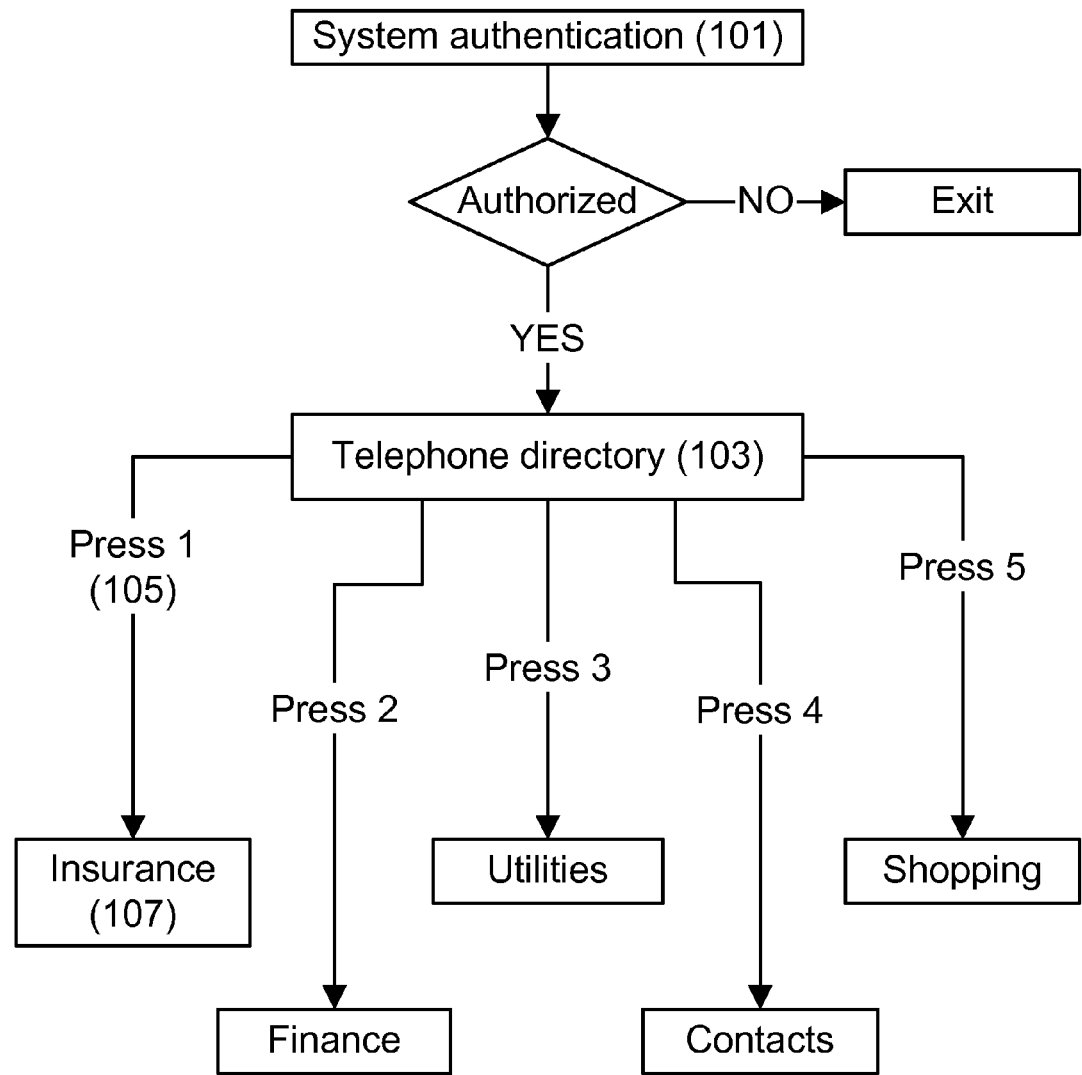
FIG. 1 is a schematic diagram for an embodiment of this invention discussed in detail in the detailed description section. It shows the authentication process and also how several services can be accessed through telephone directory.

As shown in the embodiment of FIG. 1, this application can be used not only to reach services that an individual uses in his or her day to day life, but also to reach his/her contacts (e.g. friends and family). This application frees the user from looking up for any kind of phone numbers he/she uses to make calls. It is done by storing them in a hierarchical database, provided by the telecom application, along with any personal data associated with the phone numbers that the user can push to a voice response unit or a customer representative of the service.

In one embodiment, a method for storing telephone numbers in a secure, integrated, and hierarchical database is disclosed. One example of hierarchical database comprises data related to individuals, groups, and families. The method comprises receiving and storing the telephone numbers and personal information related to the service that is associated with any of the telephone numbers, looking up a specific telephone number, navigating through the telephone numbers (e.g. steps 105, 201, 203, 207), using an interactive voice response interface (e.g. 105), authenticating a user (101), placing a first service call using the specific telephone number (209), providing a voice prompt for the user to access resources, automatically applying the personal information (307) related to the specific service corresponding to the first service call, placing a second service call, and contacting one or more of the individuals, groups, and families. In one embodiment, the personal information (305) comprises social security number, credit card number, insurance policy number, account number, and date of birth.

A system, apparatus, or device comprising one of the following items is an example of the invention: telephone directory, calling system, directory assistance, voice-enabled dialing, speech recognition, biometrics, storage for the numbers and data, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of tel. directory and calling management.

Any variations of the above teaching are also intended to be covered by this patent application.

The invention claimed is:

1. A method for storing telephone numbers in a secure, integrated, and hierarchical database, said method comprising:

receiving said telephone numbers;

storing said telephone numbers in said hierarchical database;

for a service that is associated with any of said telephone numbers, storing personal information related to said service with said telephone numbers;

wherein said personal information comprises social security number, credit card number, insurance policy number, account number, and date of birth;

wherein said hierarchical database comprises data related to individuals, groups, and families;

looking up a specific telephone number;

navigating through said telephone numbers, using an interactive voice response interface;

authenticating a user;

placing a first service call, using said specific telephone number;

providing a voice prompt for said user to access resources;

for a specific service corresponding to said first service call, automatically applying said personal information related to said specific service, wherein the applying step is initiated by a configurable key combination;

placing a second service call; and contacting one or more of said individuals, groups, and families.

* * * * *